(12) United States Patent
Kleinvachter et al.

(10) Patent No.: US 11,428,481 B2
(45) Date of Patent: Aug. 30, 2022

(54) COOLING PACKAGE CLEANING SYSTEM

(71) Applicant: Caterpillar Paving Products Inc., Brooklyn Park, MN (US)

(72) Inventors: Brent Robert Kleinvachter, Clear Lake, MN (US); Conwell K. Rife, Jr., Wayzata, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 25 days.

(21) Appl. No.: 16/704,795

(22) Filed: Dec. 5, 2019

(65) Prior Publication Data

US 2021/0170455 A1 Jun. 10, 2021

(51) Int. Cl.
| F28G 1/16 | (2006.01) |
| B08B 9/032 | (2006.01) |
| B08B 5/02 | (2006.01) |
| B60K 11/02 | (2006.01) |
| F28G 9/00 | (2006.01) |
| E01C 19/48 | (2006.01) |

(52) U.S. Cl.
CPC .................. *F28G 1/16* (2013.01); *B08B 5/02* (2013.01); *B08B 9/0328* (2013.01); *B60K 11/02* (2013.01); *F28G 9/00* (2013.01); *B08B 2209/032* (2013.01); *E01C 19/4873* (2013.01); *E01C 2301/00* (2013.01)

(58) Field of Classification Search
None
See application file for complete search history.

(56) References Cited

U.S. PATENT DOCUMENTS

| 6,622,668 | B2 | 9/2003 | Izumi | |
| 9,334,788 | B2 | 5/2016 | Stone et al. | |
| 9,568,260 | B2 | 2/2017 | Stone et al. | |
| 2011/0011665 | A1* | 1/2011 | Peterson | F01P 11/10 |
| | | | | 180/309 |
| 2014/0238643 | A1* | 8/2014 | Hains | B08B 9/023 |
| | | | | 165/95 |
| 2015/0017901 | A1* | 1/2015 | Pfohl | B60K 11/02 |
| | | | | 454/141 |

(Continued)

FOREIGN PATENT DOCUMENTS

| GB | 1524580 A | 9/1978 |
| JP | 2003314284 A | 11/2003 |
| JP | 2006329150 A | 12/2006 |

*Primary Examiner* — Mikhail Kornakov
*Assistant Examiner* — Ryan L Coleman
(74) *Attorney, Agent, or Firm* — von Briesen & Roper, s.c.

(57) ABSTRACT

A machine that includes a cooling package and a method for cleaning debris from the cooling package is disclosed. The cooling package may include a housing, a cooler, a heat exchanger, a conduit, and plurality of nozzles mounted on the conduit. The cooler may be configured to receive heated machine fluid generated by the machine. The heat exchanger may be configured to convey heat away from the cooler and may include a plurality of fins coupled to and extending outward from the cooler. The plurality of fins may define a plurality of channels. The conduit may be disposed between the housing and the plurality of fins. The plurality of nozzles are configured to discharge a fluid on the fins. The fluid may be air or a release agent. In some embodiments, a release agent may be discharged on the fins prior to the discharge of air on the fins.

15 Claims, 10 Drawing Sheets

(56) References Cited

U.S. PATENT DOCUMENTS

| | | | |
|---|---|---|---|
| 2015/0153122 A1* | 6/2015 | Stone | F01P 11/14 134/34 |
| 2015/0361627 A1* | 12/2015 | Frelich | B60W 10/30 180/65.245 |
| 2019/0078813 A1 | 3/2019 | Keshavan Raghavan | |

* cited by examiner

COOLING PACKAGE CLEANING SYSTEM

TECHNICAL FIELD

The present disclosure generally relates to cleaning systems for cooling packages on a machine and, more particularly, relates to a cleaning system for a cooling package on a paving vehicle, and the like.

BACKGROUND

Asphalt pavers are paving machines that are used to apply, spread and compact a mat of material relatively evenly over a desired base. These paving machines are regularly used in the construction of roads, parking lots and other areas where a smooth durable surface is required for cars, trucks and other vehicles to travel. A asphalt pavers generally include a hopper for receiving paving material from a truck and a conveyor system for transferring the paving material rearwardly from the hopper for discharge onto a base for a roadbed or the like. Screw augers may be used to spread the paving material transversely across the base in front of a screed assembly. The screed assembly smooths and somewhat compacts the paving material and, ideally, leaves a mat of uniform depth and smoothness. Asphalt pavers, and many other industrial machines, also include cooling packages that are configured to cool machine fluids. In order to provide desired cooling capacity within a compact space, the components of the cooling packages are often disposed in close proximity to each other. Due to the environments in which asphalt pavers and other industrial machines operate, the cooling systems require frequent cleaning as dust and debris can accumulate on the cooling system components, especially fins that facilitate dissipation of heat.

Currently there are two main ways that operators clean cooling packages. The first is the use of an air wand. However, it is difficult to access many areas of the cooling package. Alternatively, hinged cooling packages may be provided, wherein a cooling package may include a hinged door that can be opened to provide access to the various cooling components for cleaning. While beneficial, such a design may increase the footprint of the cooling package to allow for pivoting about the hinge.

U.S. Patent Pub. 2019/0078813 ("Raghaven") published Mar. 14, 2019 describes a compressor system having a refrigerated dryer for removing moisture from a wet compressed flow stream produced by a compressor. The refrigerated dryer can include a condenser having a refrigerant fluid conduit and a number of external cooling fins which assist in cooling the refrigerant fluid upon passage of a cooling flow stream past the external cooling fins. The compressor system can include an offtake passage to extract a portion of the wet compressed gas to aid in cleaning of the core area of the condenser. A better design is needed.

SUMMARY OF THE DISCLOSURE

In accordance with one aspect of the disclosure, a machine is disclosed. The machine may comprise a cooling package mounted on the machine and a fan. The cooling package may include a housing, a cooler disposed in the housing, a heat exchanger disposed in the housing and configured to convey heat away from the cooler, a conduit and a plurality of nozzles. The housing may define a cavity. The housing may have an outlet and an inlet, the outlet disposed opposite to the inlet. The cooler is configured to receive a heated machine fluid generated by the machine during operation. The heat exchanger may include a plurality of fins coupled to and extending outward from the cooler, the plurality of fins defining a plurality of channels. Each channel has a first end and a second end. The conduit may be disposed between the housing and the plurality of fins. The plurality of nozzles are mounted on the conduit and in fluid communication with the conduit, and are configured to discharge a fluid. The fan may be disposed adjacent to the housing. The fan may be configured to generate fan airflow in a first fan airflow direction from the inlet through the outlet of the housing.

In accordance with another aspect of the disclosure, a method of cleaning a cooling package disposed on a machine is disclosed. The machine may include the cooling package, a fan disposed adjacent to and in fluid communication with the cooling package, and a controller. The cooling package may include a housing having an inlet and an outlet, a cooler, a heat exchanger that includes a plurality of fins coupled to and extending outward from the cooler, a conduit, and a plurality of nozzles mounted on and in fluid communication with the conduit. The plurality of fins define a plurality of channels. The fan may be configured to generate fan airflow in a first fan airflow direction from the inlet through the outlet of the housing during a cooling operation. The fan may be further configured to generate airflow in a second fan airflow direction, the second fan airflow direction opposite to the first fan airflow direction. The method may comprise spraying a release agent on the fins; and after the spraying, blowing, by the nozzles, air from the conduit onto the fins.

In accordance with a further aspect of the disclosure, an asphalt paver is disclosed. The asphalt paver comprising a cooling package mounted on the asphalt paver and a fan. The cooling package may include a housing, a first cooler disposed in the housing, a first heat exchanger disposed in the housing and configured to convey heat away from the first cooler, a conduit, and a plurality of nozzles mounted on the conduit and in fluid communication with the conduit. The housing may define a cavity. The housing may have an outlet and an inlet, the outlet disposed opposite to the inlet. The first cooler configured to receive a first heated machine fluid generated by the asphalt paver during operation. The first heat exchanger including a first plurality of fins coupled to and extending outward from the first cooler, the first plurality of fins defining a first plurality of channels. At least a portion of the conduit is disposed between the housing and the first plurality of fins. The nozzles are configured to discharge a fluid. The fan may be disposed adjacent to the housing, and configured to generate fan airflow in a first fan airflow direction from the inlet through the outlet of the housing during cooling operation.

DETAILED DESCRIPTION

Figure 1:
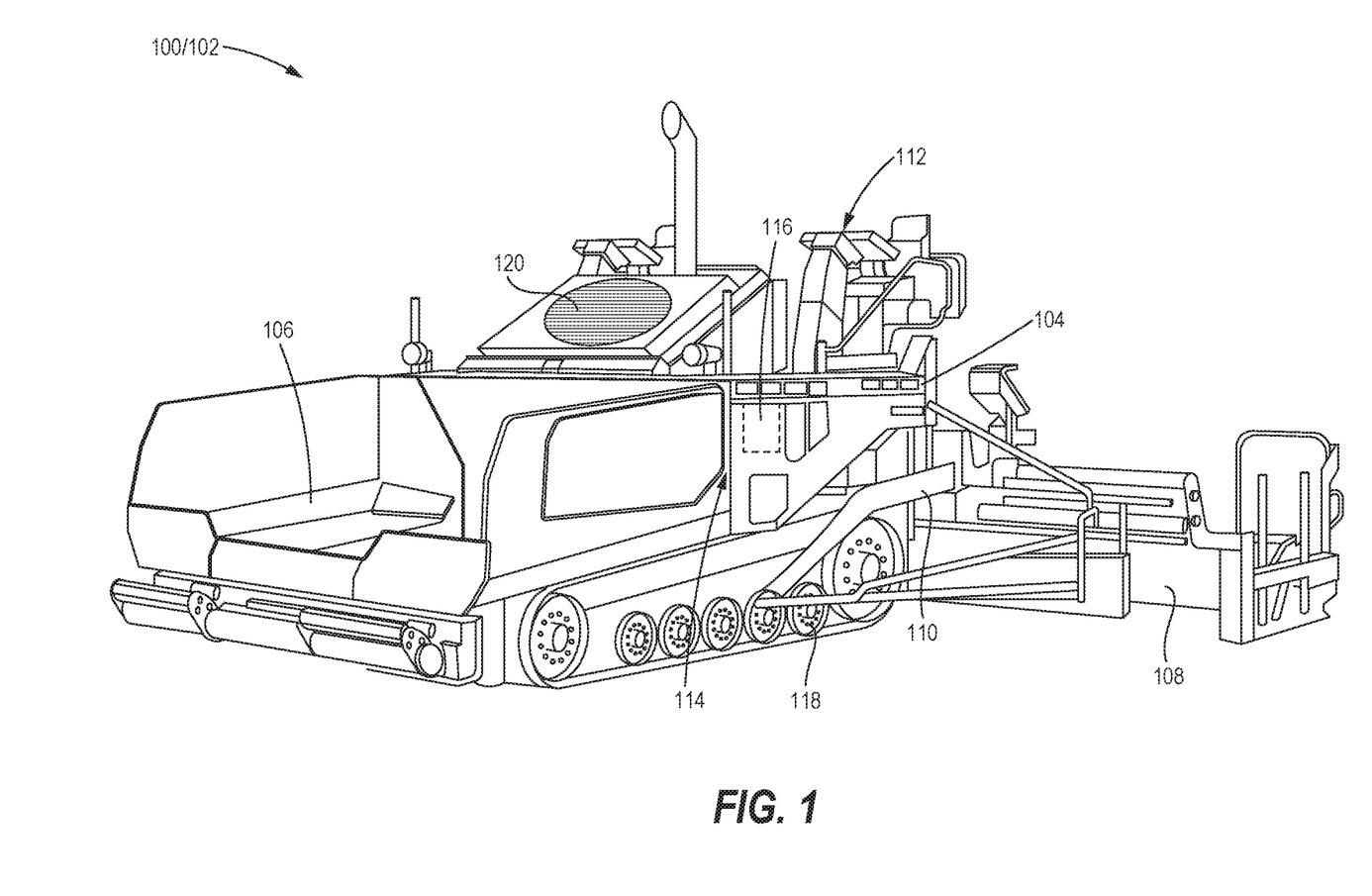
FIG. 1 is a view of an exemplary machine.

FIG. 1 illustrates one example of a machine 100 that incorporates the features of the present disclosure. The exemplary machine 100 may be a vehicle such as an asphalt paver 102 or the like. While the following detailed description and drawings are made with reference to asphalt paver 102, the teachings of this disclosure may be employed on similar machines 100.

The asphalt paver 102 may include a body frame 104, a hopper 106, a feed conveyor (not shown) and an auger (not shown). The hopper 106 is typically located at the front of the asphalt paver 102, and receives and holds asphalt paving material. The feed conveyor delivers the asphalt paving material to the spreader auger at the rear of the asphalt paver 102. The auger distributes the asphalt, laterally behind the asphalt paver 102, to the road surface in front of a screed assembly 108. The screed assembly 108 may be operably connected to the body frame 104 by a pair of pivotably mounted tow arms 110. The screed assembly 108 may be drawn behind the asphalt paver 102 by the tow arms 110. The tow arms 110, one located on each side of asphalt paver 102, pull the screed assembly 108 when the asphalt paver 102 moves. The screed assembly 108 is configured to smooth out and compresses the asphalt material that has been spread by the auger.

Further, an operator station 112 may be mounted to the body frame 104. The body frame 104 may include an engine enclosure 114 that encloses the engine 116. In one embodiment, the operator station 112 may be mounted to the body frame 104 proximal to an engine enclosure 114 and on the rear of the body frame 104. The asphalt paver 102 may be supported on the ground by a plurality of wheels or track assemblies 118.

One of ordinary skill in the art will appreciate that the engine 116 may provide power to the track assemblies 118 and a final drive assembly (not shown), via mechanical or electric drivetrain. The asphalt paver 102 also includes a fan 120 a cooling package 122 (see FIGS. 2-15). The cooling package 122 may be disposed proximal to the engine 116.

FIGS. 2-15 illustrate various exemplary embodiments of the cooling package 122 and fan 120 that may be mounted on a machine 100 such as the exemplary asphalt paver 102 shown in FIG. 1. In an embodiment, the cooling package 122 may include a housing 124, a cooler 126, a heat exchanger 128, a conduit 130, and a plurality of nozzles 132.

The housing 124 of the cooling package 122 defines a cavity 134 (best seen in FIGS. 3, 5, 7, 9, 11 and 13) that defines a first port 136 and a second port 138. In an embodiment, the first port 136 may be an inlet 137 and the second port 138 may be an outlet 139. In an embodiment the outlet 139 may be disposed opposite to the inlet 137. Air from outside the housing 124 enters the inlet 137 and air exits the housing 124 through the outlet 139. The housing 124 has an inner surface 140 and an exterior surface 142.

The fan 120 is disposed adjacent to the housing 124 and is in fluid communication with the cooling package 122 when the fan 120 is generating airflow. The fan 120 is configured to generate fan airflow that flows in a first fan airflow direction "A" from the inlet 137 to and through the outlet 139 of the housing 124 when cooling the cooling package 122. As used herein, generation of such fan airflow to cool the cooling package 122 is referred to as the "cooling operation." More specifically, the air traveling in the first fan airflow direction A flows from the inlet 137 to over and/or through the cooling package 122 and then exits the housing 124 of the cooling package 122 through the outlet 139. The fan 120 may be configured to pull (suction) or blow (push) the airflow. In embodiments in which the fan 120 is pulling the airflow during the cooling operation, the fan 120 may be disposed adjacent to the outlet 139 and may pull air into the inlet 137, over and/or through the cooling package 122, and out the outlet 139. In embodiments in which the fan 120 is pushing the airflow during the cooling operation, the fan 120 may be disposed adjacent to the inlet 137 may push air from the inlet 137, over and/or through the cooling package 122, and to (and out of) the outlet 139.

Figure 12:
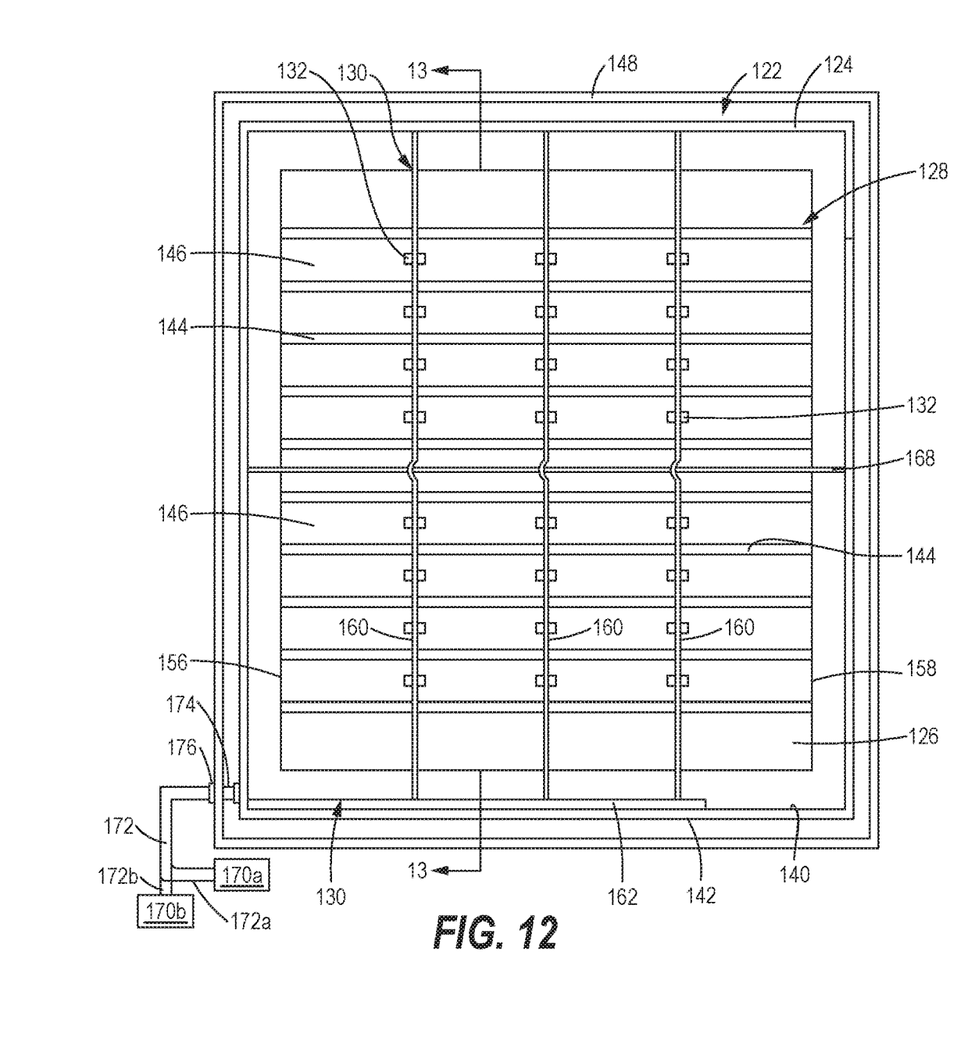
FIG. 12 is a illustrates an exemplary embodiment of the cooling package of the exemplary machine of FIG. 1.
Figure 13:
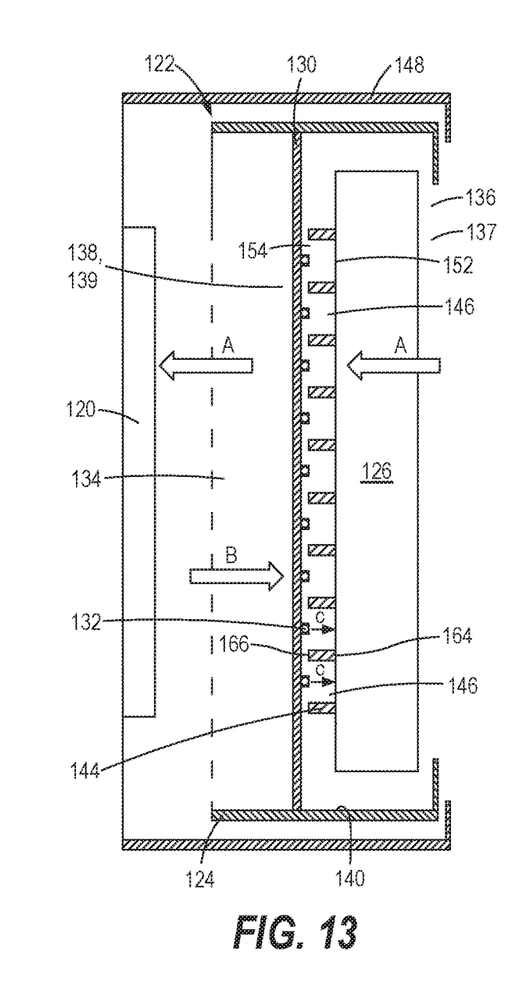
FIG. 13 is a cross sectional view taken along the lines 13-13 of the embodiment of the cooling package of FIG. 12.
Figure 14:
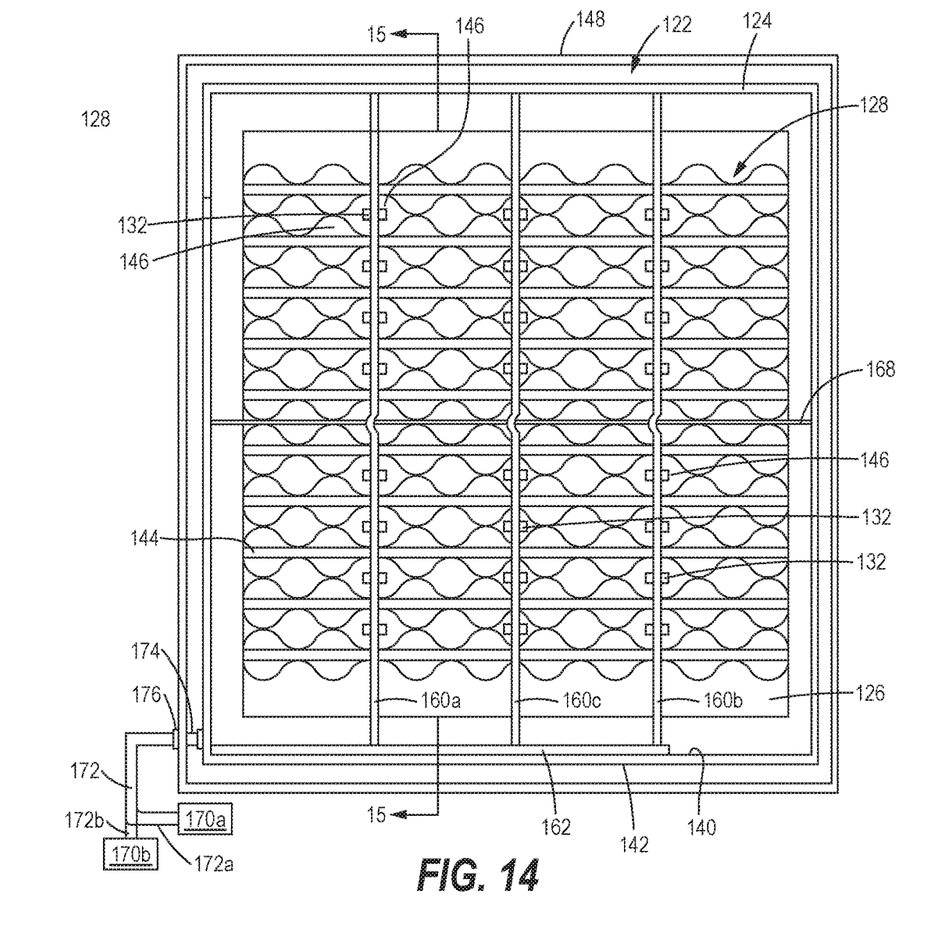
FIG. 14 is a illustrates an exemplary embodiment of the cooling package of the exemplary machine of FIG. 1.
Figure 15:
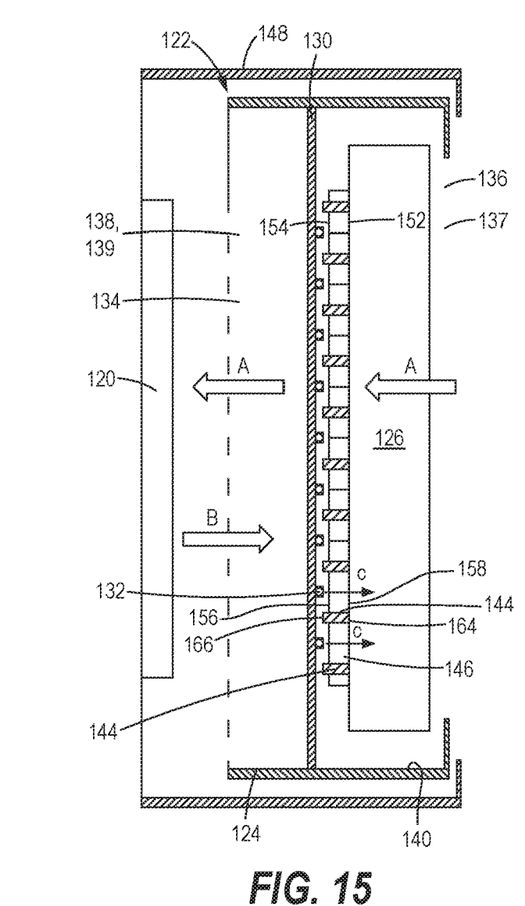
FIG. 15 is a cross sectional view taken along the lines 15-15 of the embodiment of the cooling package of FIG. 14.

The fan 120 may be further configured to generate fan airflow that flows in a second fan airflow direction "B." The second fan airflow direction B is opposite to the first fan airflow direction A (see for example, FIGS. 13 and 15). In some embodiments, the fan 120 may be configured to generate fan airflow in the second fan airflow direction B before or during a cleaning operation of the cooling package 122. In the exemplary embodiments of FIGS. 2-15, the fan 120 is disposed adjacent to the outlet 139 and operation of the fan 120 for cooling (during the cooling operation) creates a suction that pulls air from the inlet 137 of the housing 124 to the outlet 139, where the air exits the housing 124.

In some embodiments, the machine 100 may further include a casing 148 mounted on the body frame 104. The fan 120 and the cooling package 122 may be disposed in the casing 148. The casing 148 may be configured to further facilitate the suctioning or the pushing of fan airflow (generated by the fan 120) through the housing 124 and over/through the cooling package 122.

The cooler 126 is disposed in the housing 124 and is configured to receive a heated machine fluid generated by the machine 100 (in the exemplary embodiment an asphalt paver 102) during operation of the machine 100. Such heated machine fluid may be in a liquid state or in a gas state. The heated machine fluid may include water, hydraulic oil, fuel, air, or the like. Coolers 126 are known in the art, and may be for example, a radiator or the like.

The heat exchanger 128 is disposed in the housing 124 and is configured to convey heat away from the cooler 126. The heat exchanger 128 includes a plurality of fins 144 coupled to and extending outward from the cooler 126. Each fin 144 may include a base end 164 that is disposed on the cooler 126 and an outer end 166 opposite to the base end 164 and distal (away from) to the cooler 126. In an embodiment, the fins 144 are in thermal communication with the heated machine fluid contained in the cooler 126. This thermal communication facilitates the transfer of heat from the heated machine fluid in the cooler 126 to the fins 144 where the heat is then dissipated away by the fan airflow that flows over the fins 144. The plurality of fins 144 define a plurality of channels 146.

Figure 2:
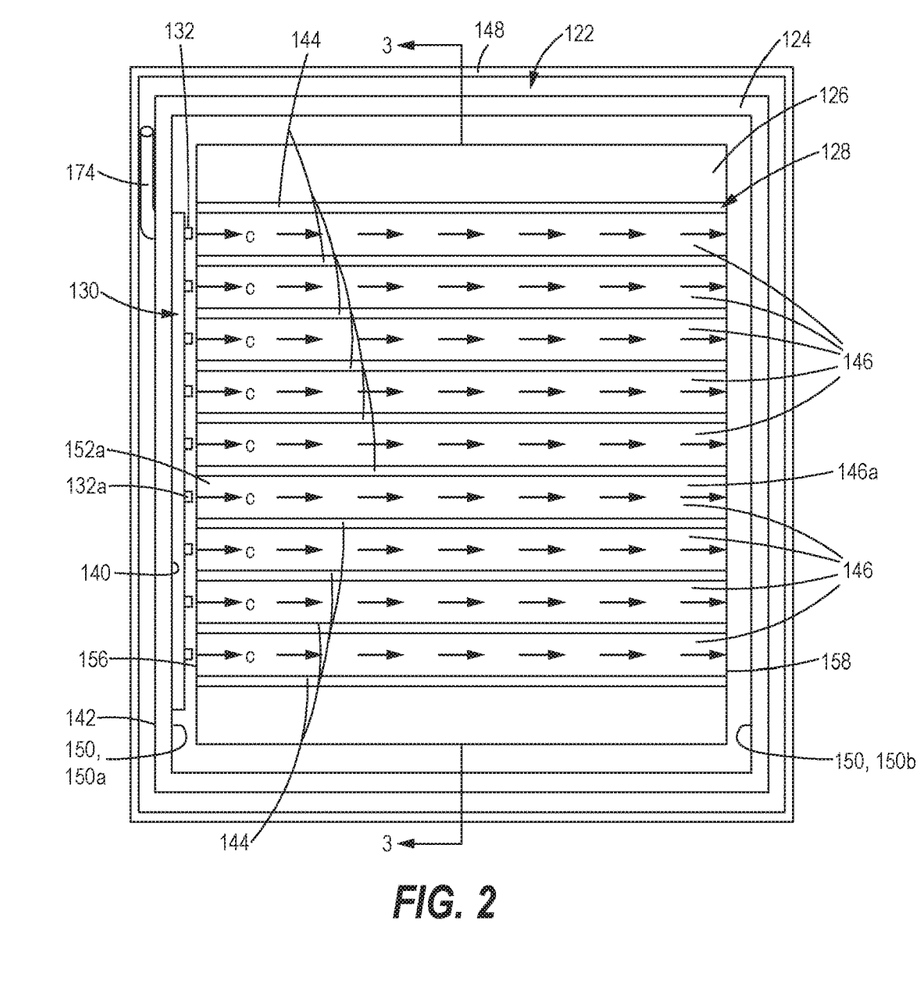
FIG. 2 is a illustrates an exemplary embodiment of the cooling package of the exemplary machine of FIG. 1.

The conduit 130 may be disposed between the housing 124 and the plurality of fins 144. In some embodiments, for example the embodiment shown in FIG. 2, the conduit 130 may be disposed between the inner surface 140 of the housing 124 and the plurality of fins 144. In the embodiment of FIG. 2, the conduit 130 is mounted to the inner surface 140 and extends along a wall 150 of the housing 124. The conduit 130 may be disposed adjacent to the channels 146.

The plurality of nozzles 132 are mounted on the conduit 130 and are in fluid communication with the interior of the conduit 130. The nozzles 132 may be configured to discharge (e.g., blow or spray) fluid. The fluid may be air or a release agent. Air may include pressurized air, compressed air, or the like. The release agent may include water, a degreaser (a degreasing agent), or the like. In some embodiments, the plurality of nozzles 132 may include air jets configured to discharge air. In some embodiments, the plurality of nozzles 132 may be configured to discharge either air or the release agent. The plurality of nozzles 132 are configured to discharge fluid to clear debris from the plurality of channels 146.

In an embodiment, each of the plurality of channels 146 may include an open bottom 152 and an open top 154 through each of which airflow generated by the fan 120 may flow from or to the cooler 126, as seen in the exemplary embodiments illustrated in FIGS. 3, 5, 7, 9, 11, 13 and 15. In an embodiment, the open bottom 152 may be disposed between the base ends 164 of a pair of fins 144. In an embodiment, the open top 154 may be disposed between outer ends 166 of a pair of fins 144. In the embodiments of FIGS. 2-5 and 10-13, each channel 146 may be oriented to longitudinally extend (across the cooler 126) in a direction that is transverse to (situated or extending across) the first fan airflow direction A. As more fully discussed herein later, in the embodiments of FIGS. 6-9 and 14-15 the fins 144 are corrugated and in those embodiments, the corrugated portions of the plurality of fins 144 define the plurality of channels 146. In the embodiments of FIGS. 6-9 and 14-15, the open bottom 152 may be disposed adjacent to the base end 164 of the fin 144, and the open top 154 may be disposed adjacent to the outer end 166 of the fin 144, and the channel 146 formed by the corrugated portion of the fin 144 may be oriented to extend toward the cooler 126 in a direction that is generally parallel to the first fan airflow direction A.

Figure 3:
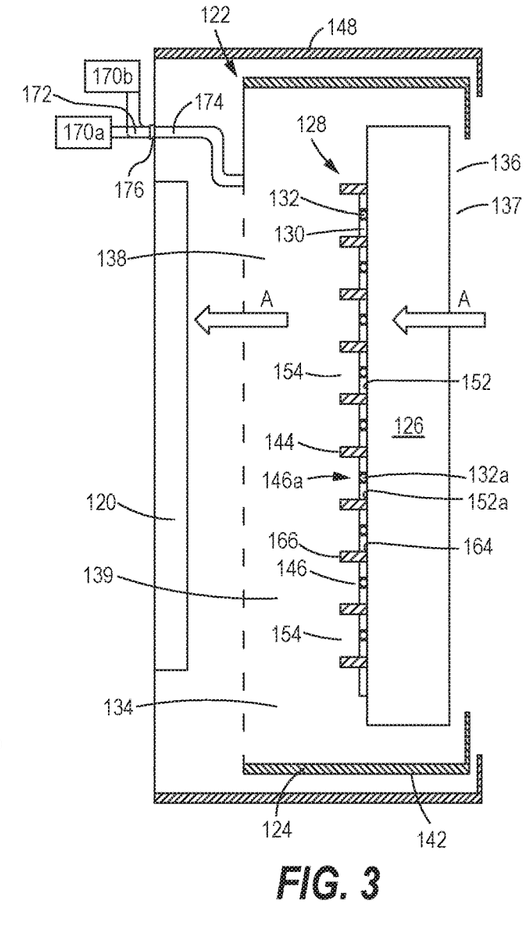
FIG. 3 is a cross sectional view taken along the lines 3-3 of the embodiment of the cooling package of FIG. 2.

In the embodiment illustrated in FIGS. 2-3, each channel 146 extends in a direction that is generally transverse (e.g., in the embodiment, perpendicular) to first fan airflow direction A. Each channel 146 has a first end 156 and a second end 158. In the embodiment of FIG. 2, the first end 156 is proximal (near) to a first wall 150a of the housing 124, and the second end 158 is proximal to a second wall 150b of the housing 124. In the embodiment, the second wall 150b disposed opposite to the first wall 150a.

In some embodiments, such as the one shown in FIGS. 2-3, some or all of the nozzles 132 may be disposed adjacent to the open bottoms 152 of the plurality of channels 146. For example, a first nozzle 132a of the plurality of nozzles 132 in FIGS. 2-3 may be disposed adjacent to a first open bottom 152a of a first channel 146a of the plurality of channels 146.

In the embodiment illustrated in FIG. 2, the nozzles 132 are oriented to discharge fluid into the channels 146. In an embodiment, the nozzles 132 may be oriented to discharge at least some of the fluid in a direction "C" (see FIG. 2) that is generally perpendicular to first fan airflow direction A (see FIG. 3).

In other embodiments, the conduit 130 may include a plurality of branches 160 connected by and in fluid communication with a passageway 162. In some embodiments, the plurality of branches 160 and the passageway 162 may be disposed between the housing 124 and the fins 144.

Figure 4:
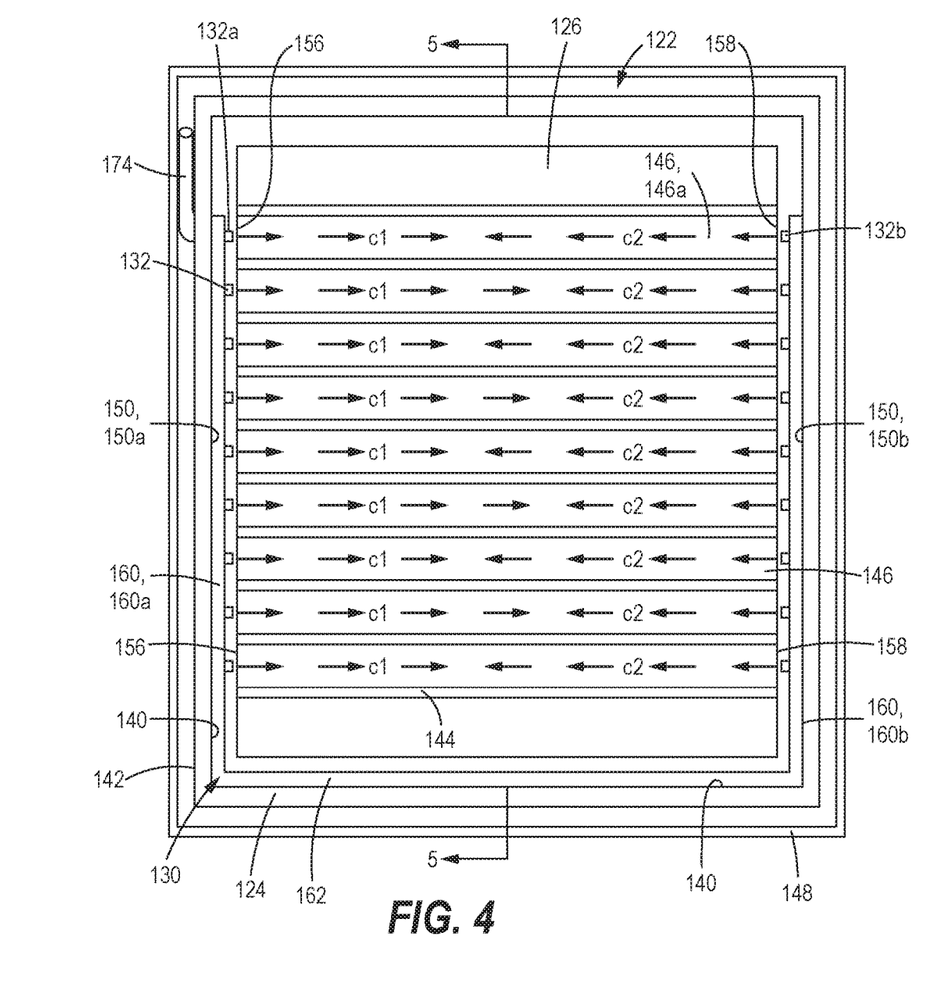
FIG. 4 is a illustrates an exemplary embodiment of the cooling package of the exemplary machine of FIG. 1.
Figure 5:
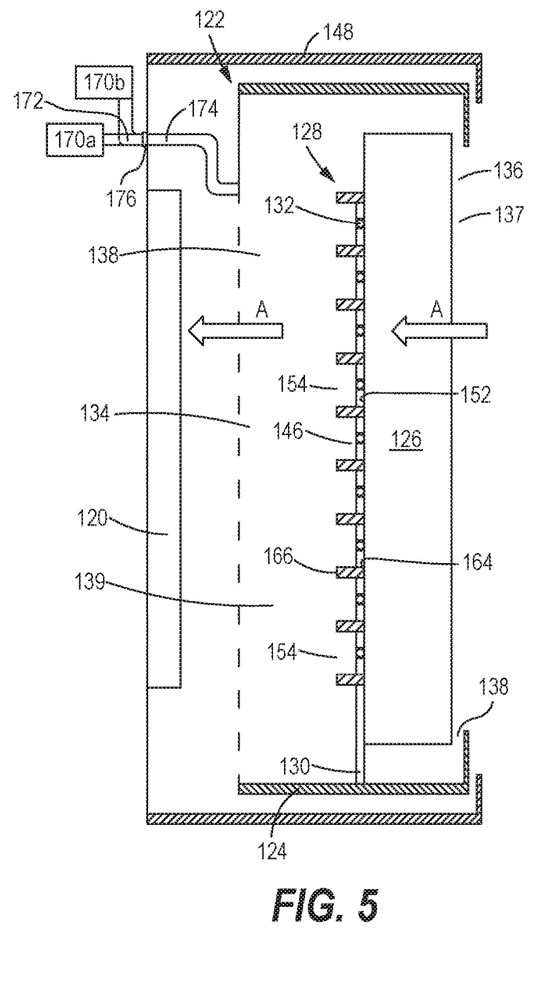
FIG. 5 is a cross sectional view taken along the lines 5-5 of the embodiment of the cooling package of FIG. 4.

FIGS. 4-5 illustrate an exemplary embodiment that is similar to that discussed above with regard to FIGS. 2-3 except that the conduit 130 includes a first branch 160a and a second branch 160b connected by a passageway 162. In the embodiment of FIG. 4, each of the first branch 160a and the second branch 160b and the passageway 162 are disposed between the housing 124 and the fins 144. In particular, the first branch 160a, the second branch 160b and the passageway 162 are each disposed between the inner surface 140 of the housing 124 and the fins 144. The first branch 160a and the second branch 160b may be disposed on opposing walls 150 of the housing 124, for example, the first branch 160a may be disposed on a first wall 150a and the second branch 160b may be disposed on a second wall 150b, the first wall 150a disposed opposite to the second wall 150b. In an embodiment, the first branch 160a and the second branch 160b may be disposed at least partially across the outlet 139. In an embodiment, the first branch 160a and the second branch 160b may be disposed transverse to the plurality of channels 146 (that longitudinally extend transverse to the first fan airflow direction A). In one embodiment, the first branch 160a and the second branch 160b may be oriented parallel to each other.

One or more nozzles 132 may be disposed on the first branch 160a adjacent to the open bottoms 152 of the channels 146 (best seen in FIG. 5) and one or more nozzles 132 may be disposed on the second branch 160b adjacent to the open bottoms 152 of the channels 146 in a similar manner to the nozzles 132 disposed on the conduit 130 of the embodiment illustrated in FIGS. 2-3; each nozzle 132 may be oriented to discharge fluid into a channel 146. In one embodiment, the one or more nozzles 132 disposed on the first branch 160a may be oriented to discharge at least some fluid in a direction C1, and the one or more nozzles 132 disposed on the second branch 160b may be oriented to discharge at least some fluid in a direction C2 that is opposite to the direction C1 (best seen in FIG. 4). This may be particularly helpful to facilitate removal of debris when the channels 146 are relatively long in longitudinal length. For example, in the embodiment shown in FIG. 4, a first nozzle 132a disposed on the first branch 160a may discharge fluid into the first end 156 of a first channel 146a and a second nozzle 132b disposed on the second branch 160b may discharge fluid into the second end 158 of the first channel 146a.

Figure 6:
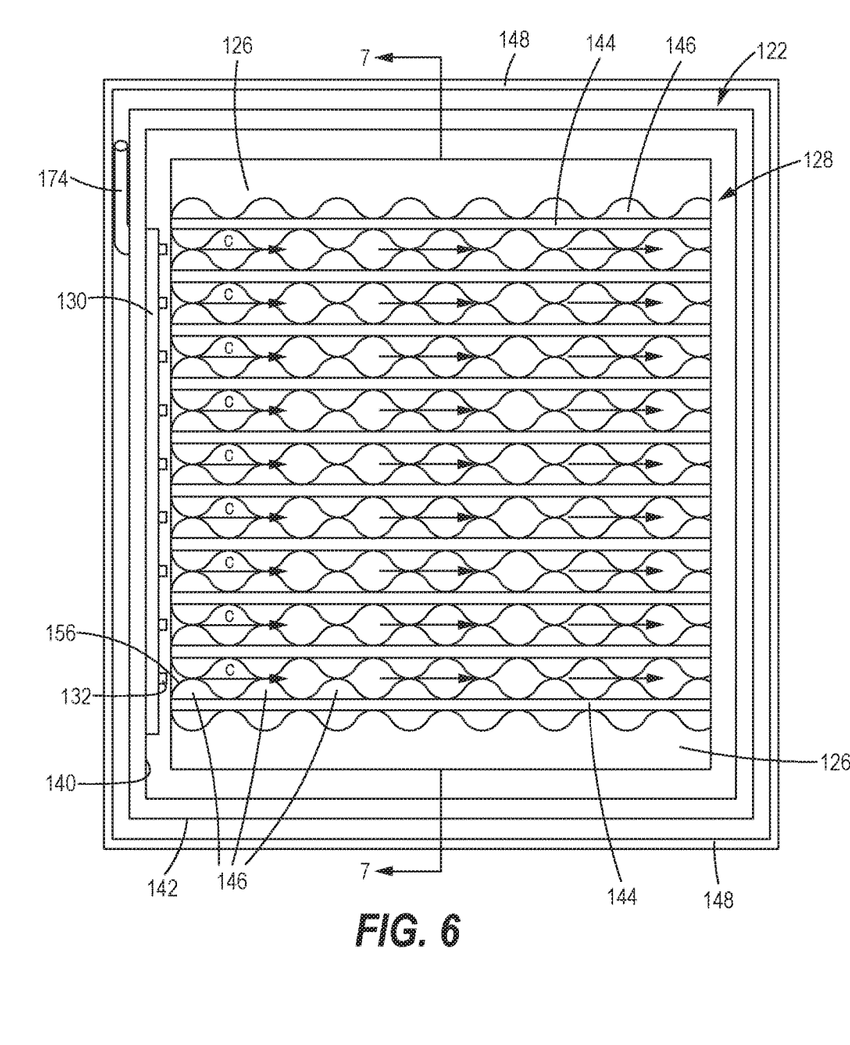
FIG. 6 is a illustrates an exemplary embodiment of the cooling package of the exemplary machine of FIG. 1.
Figure 7:
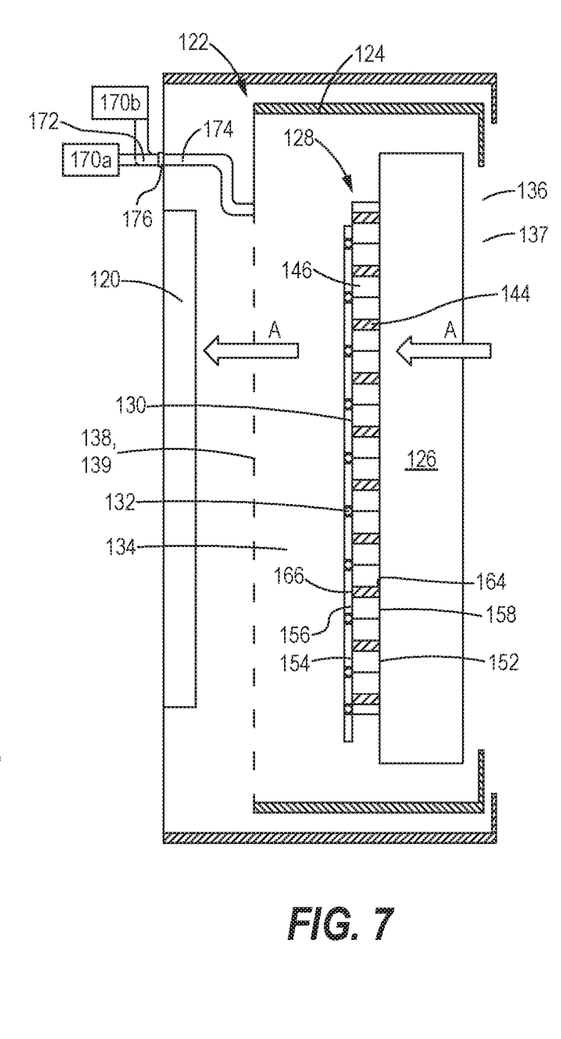
FIG. 7 is a cross sectional view taken along the lines 7-7 of the embodiment of the cooling package of FIG. 6.

FIGS. 6-7 illustrates yet another exemplary embodiment that is similar to that discussed above with regard to FIGS. 2-3 except that the fins 144 of FIGS. 6-7 are corrugated (corrugated fins 144, as known in the art). Each of the channels 146 of the plurality of channels 146 may be oriented to longitudinally extend in a direction that is generally parallel to first fan airflow direction A, in other words extending toward the cooler 126 and not across the cooler 126. Each channel 146 has a first end 156 and a second end 158. In the embodiment of FIGS. 6-7, each fin 144 may include a base end 164 that is disposed on the cooler 126 and an outer end 166 opposite to the base end 164 and distal (away from) to the cooler 126. The open bottoms 152 of the channels 146 are disposed proximal to the base ends 164 of the fins 144, and the open tops 154 are disposed proximal to the outer ends 166 of the fins 144. In the embodiment of FIGS. 6-7, the second end 158 of the channel 146 is proximal (near) to the cooler 126, and the first end 156 is opposite to the second end 158. The nozzles 132 on the conduit 130 may be disposed above the first ends 156 of the channels 146 and above the outer ends 166 of the fins 144 and oriented to discharge fluid across the first ends 156 of the channels 146 and/or the outer ends 166 of the fins 144, as opposed to the embodiment of FIGS. 2-3 where the fluid was discharged by the nozzles 132 into the channels 146 proximal to the open bottoms 152 of the channels 146. In an embodiment, the nozzles 132 may be oriented to discharge at least some fluid in a direction "C" (see FIG. 6) that is generally perpendicular to first fan airflow direction A (see FIG. 7).

Figure 8:
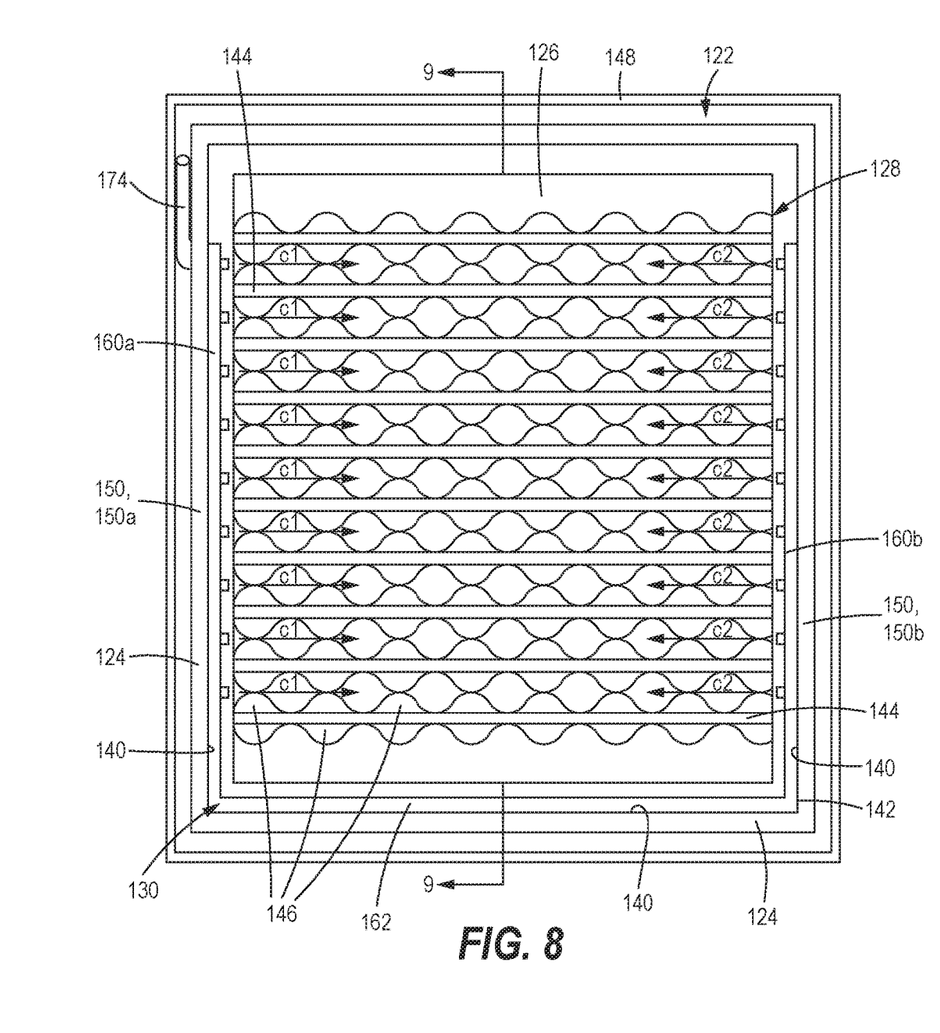
FIG. 8 is a illustrates an exemplary embodiment of the cooling package of the exemplary machine of FIG. 1.
Figure 9:
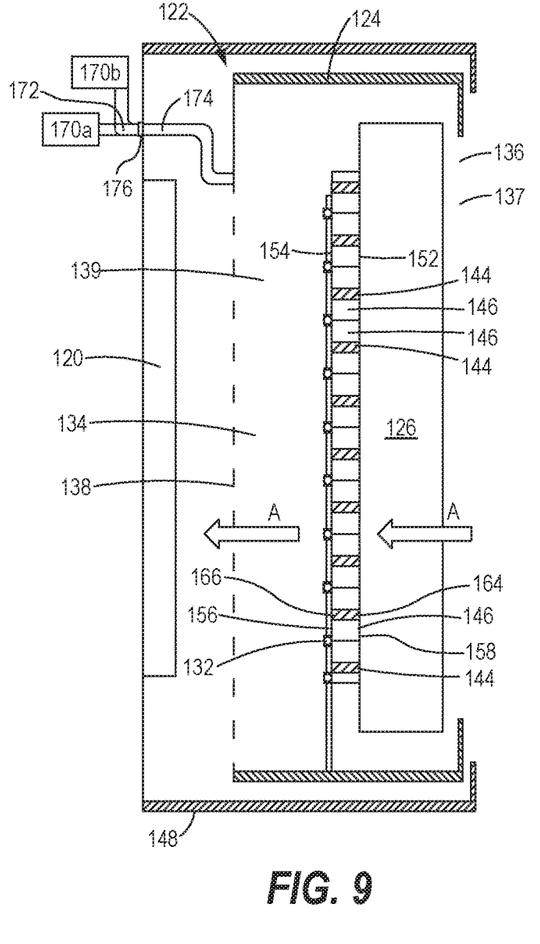
FIG. 9 is a cross sectional view taken along the lines 9-9 of the embodiment of the cooling package of FIG. 8.

FIGS. 8-9 illustrate an exemplary embodiment that is similar to that discussed above with regard to FIGS. 6-7 except that the conduit 130 includes a first branch 160a and a second branch 160b connected by a passageway 162. In the embodiment of FIG. 8, each of the first branch 160a and the second branch 160b and the passageway 162 are disposed between the housing 124 and the fins 144. In particular, the first branch 160a, the second branch 160b and the passageway 162 are each disposed between the inner surface 140 of the housing 124 and the fins 144. The first branch 160a and the second branch 160b may be disposed on opposing walls 150 of the housing 124, for example, the first branch 160a may be disposed on a first wall 150a and the second branch 160b may be disposed on a second wall 150b, the first wall 150a disposed opposite to the second wall 150b. In an embodiment, the first branch 160a and the second branch 160b may be disposed at least partially across the outlet 139. In an embodiment, the first branch 160a and the second branch 160b may be parallel to the plurality of channels 146 (that longitudinally extend parallel to the first fan airflow direction A). In one embodiment, the first branch 160a and the second branch 160b may be oriented parallel to each other. In such an embodiment, the nozzles 132 on the conduit 130 may be disposed above the outer ends 166 of the fins 144 and oriented to discharge fluid across the first ends 156 of the channels 146 and/or the outer ends 166 of the fins 144. In one embodiment, the one or more nozzles 132 disposed on the first branch 160a may be oriented to discharge at least some of the fluid in a direction C1, and one or more nozzles 132 disposed on the second branch 160b may be oriented to discharge at least some of the fluid in a direction C2 that is opposite to the direction C1 (best seen in FIG. 8). This may be particularly helpful to facilitate removal of debris when the fins 144 and/or cooler 126 are/is relatively long in length.

Figure 10:
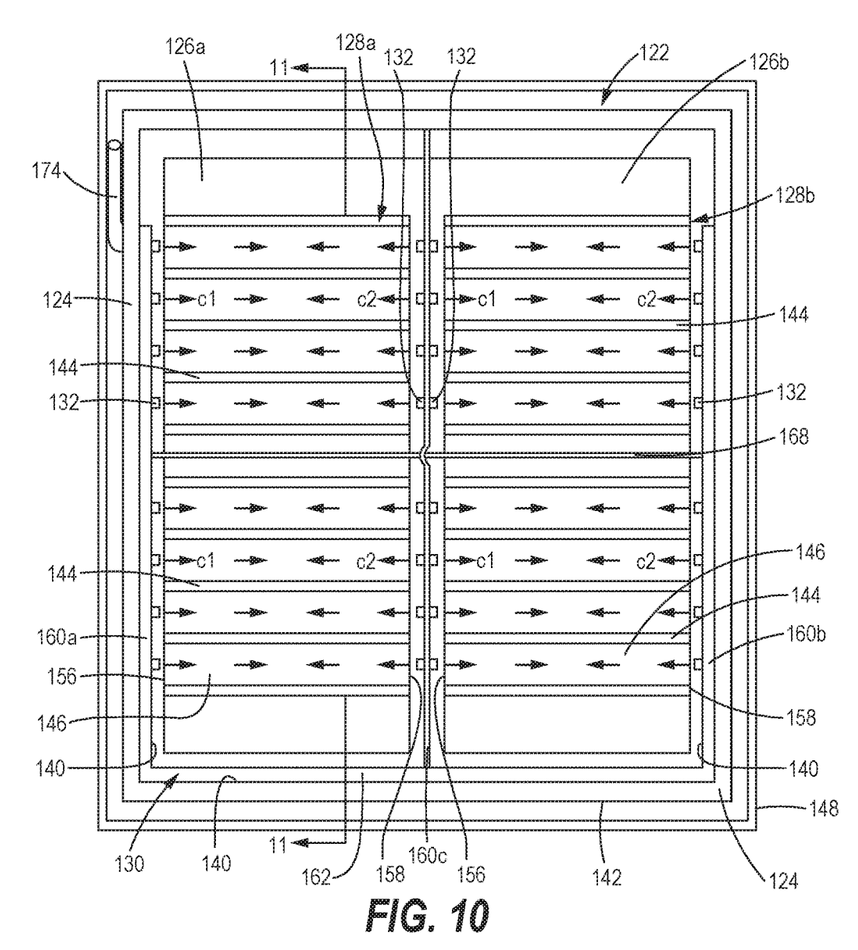
FIG. 10 is a illustrates an exemplary embodiment of the cooling package of the exemplary machine of FIG. 1.
Figure 11:
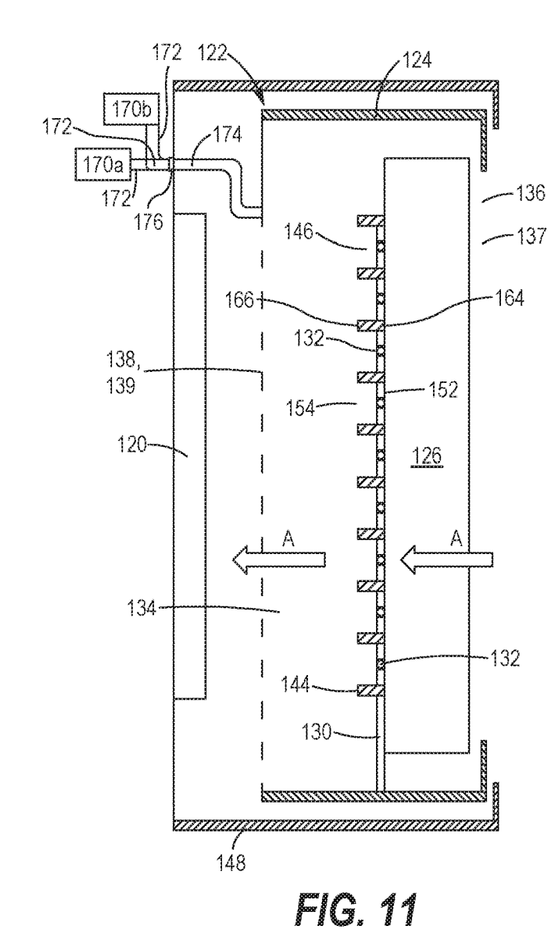
FIG. 11 is a cross sectional view taken along the lines 11-11 of the embodiment of the cooling package of FIG. 10.

FIGS. 10-11 illustrates yet another exemplary embodiment. This embodiment is similar to that discussed above with regard to FIG. 4 except that in the embodiment illustrated in FIGS. 10-11, the cooling package 122 includes a plurality of coolers 126 and a plurality of heat exchangers 128 contained in the same housing 124, and the conduit 130 includes additional branches 160 in fluid communication with the passageway 162. In exemplary embodiment illustrated in FIGS. 10-11, there is a first cooler 126a associated with a first heat exchanger 128a, and a second cooler 126b associated with a second heat exchanger 128b, and the conduit 130 includes a first branch 160a, a second branch 160b and a third branch 160c connected by a passageway 162.

The first heat exchanger 128a includes a first plurality of fins 144 coupled to and extending outward from the first cooler 126a. In an embodiment, the first plurality of fins 144 are in thermal communication with a heated machine fluid in the first cooler 126a. Similarly, the second heat exchanger 128b includes a second plurality of fins 144 coupled to and extending outward from the second cooler 126b. The first plurality of fins 144 define a first plurality of channels 146. The second plurality of fins 144 define a second plurality of channels 146. Similar to the embodiments discussed previously herein, each channel 146 of the first plurality of channels 146 includes a first end 156 and a second end 158, and each channel 146 of the second plurality of channels 146 includes a first end 156 and a second end 158.

Each of the first branch 160a, second branch 160b and third branch 160c are in fluid connection with the passageway 162. The first branch 160a may be disposed between the housing 124 and the first plurality of fins 144. The second branch 160b may be disposed between the housing 124 and the second plurality of fins 144. The third branch 160c may be disposed between the first plurality of fins 144 and second plurality of fins 144. The passageway 162 may be disposed between the housing 124 and both the first plurality of fins 144 and the second plurality of fins 144.

In an embodiment, the plurality of nozzles 132 may be mounted on the various branches 160 and each nozzle 132 is in fluid communication with the interior of the conduit 130. In the embodiment illustrated in FIG. 10, nozzles 132 are mounted on the first branch 160a, the second branch 160b and the third branch 160c of the conduit 130. In one embodiment, one or more nozzles 132 disposed on the first branch 160a may be oriented to discharge at least some of the fluid in a direction C1 into a channel 146 disposed on the first heat exchanger 128a, and one or more nozzles 132 disposed on the second branch 160b may be oriented to discharge at least some of the fluid in a direction C2 into a channel 146 disposed on the second heat exchanger 128b (the direction C2 opposite to the direction C1) (best seen in FIG. 10). Nozzles 132 on the first branch 160a and the second branch 160b may be disposed adjacent to the open bottom 152 of the respective channel 146 into which each discharges. Furthermore, at least one nozzle 132 of the third branch 160c may be oriented to discharge at least some fluid in a direction C2 into a channel 146 disposed on the first heat exchanger 128a, and at least one other nozzle 132 on the third branch 160c may be oriented to discharge at least some fluid in a direction C1 into a channel 146 disposed on the second heat exchanger 128b.

The third branch 160c may extend across the outlet 139 in a direction that is transverse to the channels 146 of both the first heat exchanger 128a and second heat exchanger 128b and may optionally be further supported by a member 168 that extends across the housing 124 from the first wall 150a to the second wall 150b of the housing 124. In the embodiment shown in FIG. 10, the member 168 may extend in a direction that is transverse to one or more of the branches 160.

FIGS. 12-13 illustrate another exemplary embodiment that is similar to that of FIGS. 2-3 except that the conduit 130 includes one or more branches 160 in fluid communication with a passageway 162. The passageway 162 may be disposed on the inner surface 140 of the housing 124. The plurality of branches 160 may be disposed across the outlet 139, over the channels 146 and in a direction transverse to the direction in which the plurality of channels 146 longitudinally extend. One or more nozzles 132 are disposed on each of the branches 160 and over the channels 146 and each of the one or more nozzles 132 may be oriented to discharge at least some of the fluid in a direction C (best seen in FIG. 13) into one or more of the channels 146.

FIGS. 14-15 illustrate another embodiment that is similar to that of FIGS. 12-13, except that each fin 144 is corrugated and each channel 146 in the embodiment of FIG. 14 is oriented to longitudinally extend generally parallel to the first fan airflow direction A. The open bottoms 152 of the channels 146 are disposed adjacent to the base ends 164 of the fins 144, and the open tops 154 are disposed adjacent to the outer ends 166 of the fins 144. One or more nozzles 132 are disposed on each of the branches 160 and over the channels 146 and each of the one or more nozzles 132 may be oriented to discharge at least some of the fluid in a direction C (best seen in FIG. 15) into one or more of the channels 146.

In each embodiment, fluid in the conduit 130 and discharged from the nozzles 132 is obtained from a fluid source 170 that is in fluid communication with the conduit 130. As discussed herein earlier, the fluid may be air or a release agent. Air may include pressurized air, compressed air, or the like. The release agent may include water, a degreaser, or the like.

The fluid source 170 may be disposed on-board the machine 100 or remote from the machine 100. In some embodiments, the fluid source 170 may be an apparatus that generates fluid that will be carried by the conduit 130 and discharged from the nozzles 132; such an apparatus may be disposed on-board the machine 100 or may be disposed remote from the machine 100.

Figure 16:
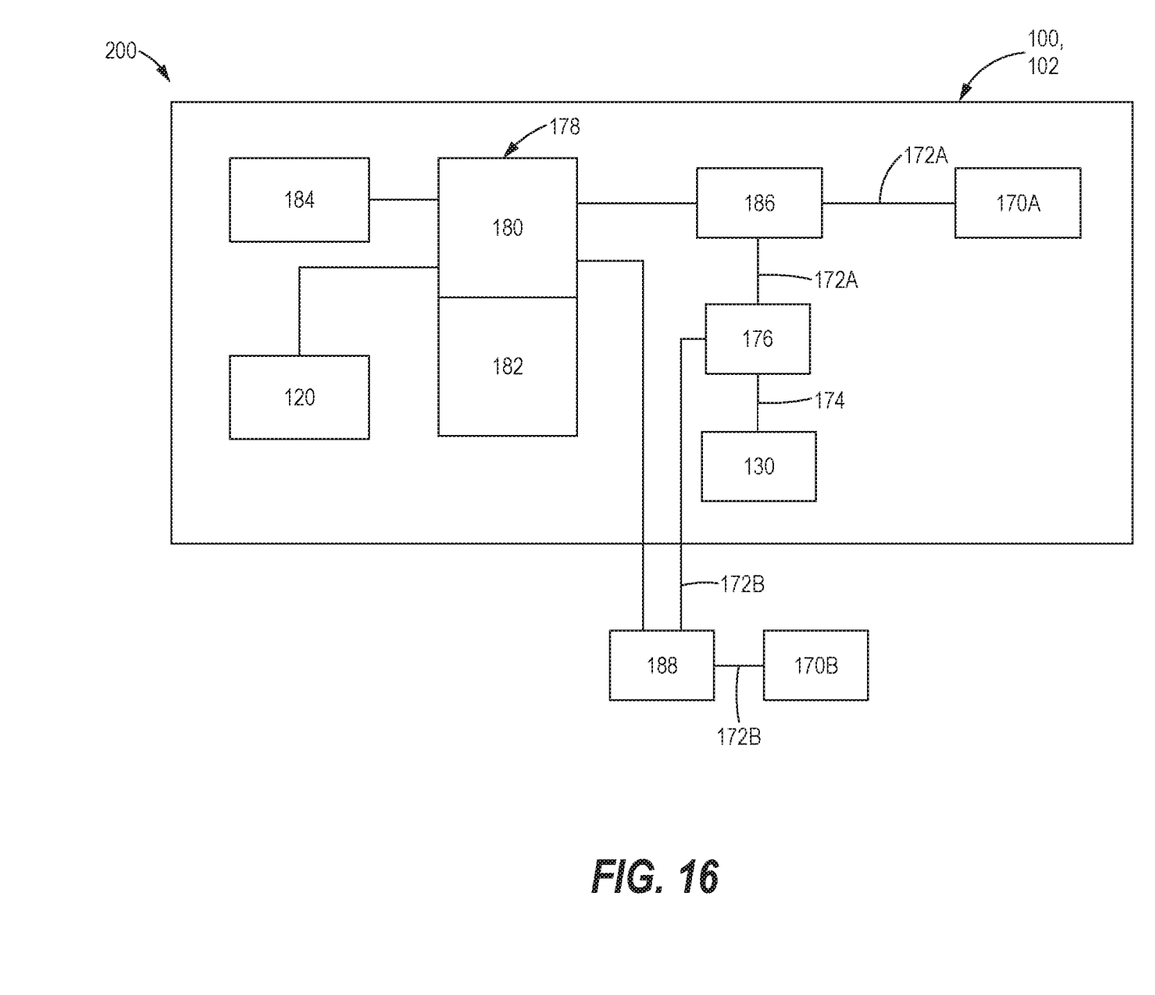
FIG. 16 is a schematic representation of an exemplary system 1600 incorporated in the exemplary machine of FIG. 1.

As shown in FIG. 16, the fluid source 170 may be in fluid communication with the conduit 130 via one or more distribution lines 172. In some embodiments, a duct 174 may be disposed between the conduit 130 and the distribution line 172 and is in fluid communication with both. In an embodiment, the duct 174 may extend from a port in the housing 124 to a port in the casing 148. Alternatively, in any of the embodiments discussed above, the one or more fluid sources 170 may be disposed off of the machine 100 and may be fluidly connected to the conduit 130 or the duct 174 via one or more distribution lines 172. Such distribution lines 172 may be connected directly to the conduit 130 or to the duct 174 via connectors 176 (for example, quick-change connectors 176 or the like).

The use of connectors 176 that allow quick connections/release may be beneficial in embodiments in which a fluid source 170 is remote from the machine 100 or in embodiments in which a first fluid is discharged from the nozzles 132 and then a (different) second fluid is subsequently discharged from the nozzles 132. For example, in some such embodiments, the first fluid may be a release agent such as water and the second fluid that is subsequently discharged may be pressurized air. The same conduit 130 may be utilized to carry the first and second fluids. A first fluid source 170a may supply the first fluid via a first distribution line 172a and a second fluid source 170b may supply the second fluid via a second distribution line 172b. The first distribution line 172a may be connected via connectors 176 to the duct 174 by an operator when the first fluid is desired to be discharged from the nozzles 132. When it is desired to discharge the second fluid from the nozzles 132, the first distribution line 172a may be released from the connector 176 and the second distribution line 172b connected via the connector 176 to the duct 174 to allow the second fluid to be discharged from the nozzles 132. In some embodiments, it may be desired to change the nozzles 132 that were used for the first fluid to nozzles 132 that are appropriate for the second fluid. In other embodiments, the same nozzles 132 may be utilized to discharge (separately) the first fluid and subsequently the second fluid.

The asphalt paver 102 may further include a controller 178. As shown in FIG. 16, the controller 178 may include a processor 180 and a memory component 182. The processor 180 may be a microprocessor or other processor as known in the art. The processor 180 may execute instructions and generate control signals for activating one or more cleaning operations when an activation signal is received from a user interface 184. Alternatively, such cleaning operations disclosed herein may be automatically triggered by the controller 178 based on the elapsing of a period of time, elapsing of a period of operation time, at the end of an operation (for example, paving operation) or other desired parameter. Such cleaning operations may include stopping generation by the fan 120 of airflow in a first fan airflow direction A from the inlet 137 to the outlet 139 of the housing 124, activating the pump 186 to force fluid from a fluid source 170 to the conduit 130, activating valves 188 to allow fluid to flow to the conduit 130, or prior to or during operation of the nozzles 132 activating the fan 120 to generate airflow in a second fan airflow direction B that is opposite to the first fan airflow direction A. Such instructions that are capable of being executed by a computer may be read into or embodied on a computer readable medium, such as the memory component 182 or provided external to the processor 180. In alternative embodiments, hard wired circuitry may be used in place of, or in combination with, software instructions to implement a control method.

The term "computer readable medium" as used herein refers to any non-transitory medium or combination of media that participates in providing instructions to the processor 180 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor 180 can read.

The controller 178 is not limited to one processor 180 and memory component 182. The controller 178 may be several processors 180 and memory components 182.

FIG. 16 illustrates a schematic of an exemplary system 200 for the asphalt paver 102. As can be seen in FIG. 16, the controller 178 may be in operably communication with the fan 120 and the user interface 184. In some embodiments, for example in scenarios in which a fluid source 170a is disposed on the machine 100, the controller 178 may also be in operable communication with a pump 186 configured to force fluid out of the fluid source 170a to the conduit 130. In some embodiments, the controller 178 may be configured to activate/deactivate/control such a pump 186. Alternatively, the controller 178 may be in operable communication with one or more valves 188 configured to allow or stop the flow of pressurized fluid (for example, pressurized air) from a fluid source 170b to the conduit 130. In some embodiments, the controller 178 may be configured to open the one or more valves 188 to allow fluid to flow from the fluid source 170b to the conduit 130 and may be configured to shut the one or more valves 188 to stop the flow of fluid from the fluid source 170b to the conduit 130.

Also disclosed is a method of cleaning the cooling package 122 of a machine 100. The method may include spraying a release agent on the fins 144 of the heat exchanger 128; and after the spraying, blowing by the nozzles 132 air from the conduit 130 onto the fins 144.

INDUSTRIAL APPLICABILITY

Figure 17:
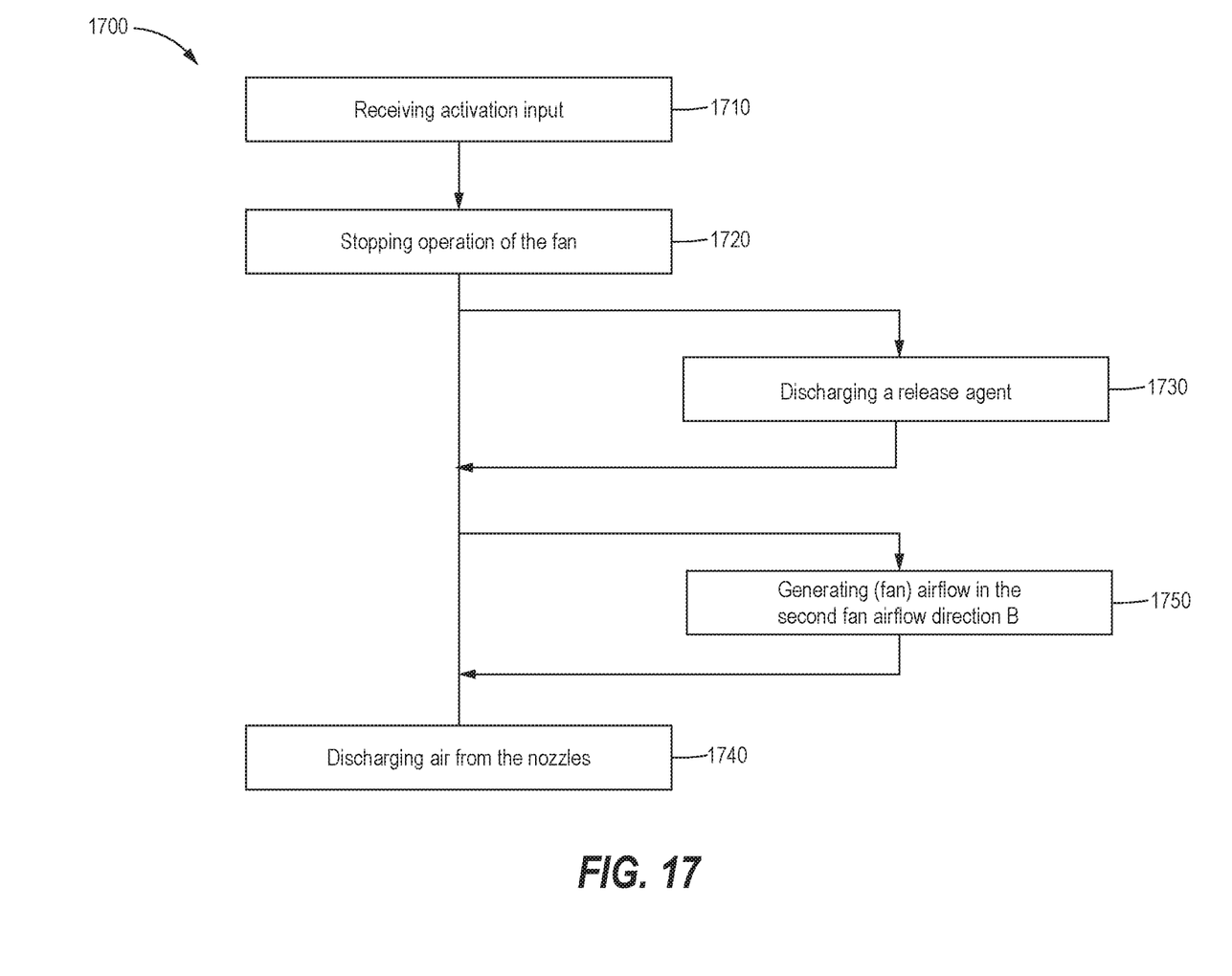
FIG. 17 is an exemplary process for cleaning a cooling package.

FIG. 17 illustrates an exemplary process 1700 for clearing debris from the cooling package 122 of a machine 100 or asphalt paver 102. This process 1700 may be triggered for the machine 100 or asphalt paver 102 by activation, for example by an operator, of a user interface 184, or may be triggered automatically by the controller 178 on the machine 100 (or asphalt paver 102), for example after a period of time of operation of the machine 100 has elapsed.

In some embodiments, for example an embodiment in which the activation is triggered automatically, the first fluid source 170a and/or second fluid source 170b may be disposed on the machine 100. In some embodiments, for example, embodiments in which activation may be triggered by an operator, the first fluid source 170a and/or second fluid source 170b may be disposed remote from the machine 100 and an operator or the like may connect such first fluid source 170a and/or second fluid source 170b to the conduit 130 via one or more distribution lines 172, the duct 174 and connectors 176.

Block 1710 includes receiving by the controller 178 an activation input.

Block 1720 includes, stopping by the controller 178 operation of the fan 120. This block 1720 is optional. For example, the fan 120 may be generating airflow in a first fan airflow direction A during a cooling operation of the machine 100. In block 1720, generation of airflow in a first fan airflow direction A is stopped.

The process 1700 further includes, discharging (e.g., spraying) a release agent from the conduit 130 on the fins 144 in block 1730. This block is optional. In some embodiments, the controller 178 may activate a pump 186 to force the release agent from a fluid source 170 (e.g., a tank) to the conduit 130.

The process 1700 further includes, in block 1740, discharging (e.g., blowing) air from the nozzles 132 of the conduit 130 on the fins 144 or into or across the channels 146 (of the heat exchanger 128). In some embodiments, in which the fluid source 170 of the air is disposed on the machine 100, the controller 178 may activate a first pump 186a to force the air to the conduit 130 and out of the nozzles 132, or may open one or more valves 188 to allow pressurized air to flow into the conduit 130 and out of the nozzles 132.

In the embodiment illustrated in FIGS. 2-3, fluid received by the conduit 130 is discharged from the nozzles 132 into the channels 146. When the fluid is air (e.g., pressurized air or the like), the air pushes debris out of the channel 146 as the air flows along the length of the channel 146.

In the embodiment illustrated in FIGS. 4-5, fluid received by the conduit 130 flows into the first branch 160a and through the passageway 162 to the second branch 160b. The fluid is discharged from the nozzles 132 on each of the first branch 160a and the second branch 160b into the channels 146. In the embodiment illustrated in FIGS. 4-5, the fluid is discharged by the nozzles at both the first end 156 and the second end 158 of the channels 146. When the fluid is air (e.g., pressurized air or the like), the air forces debris out of the channel 146 as the air flows in the channel 146.

In the embodiment illustrated in FIGS. 6-7, fluid received by the conduit 130 is discharged from the nozzles 132. The discharge is adjacent to the first ends 156 (of the channels 146) that are distal from the base ends 164 of the fins 144. When the fluid is air (e.g., pressurized air or the like), the air pushes debris off of the first ends 156 of the channels 146 (and off of the outer ends 166 of the fins 144) as the air flows in a direction generally transverse to the first fan airflow direction A generated by the fan 120 during the cooling operation (the fan 120, in this embodiment, is not generating airflow in the first fan airflow direction A during the discharge of air from the nozzles 132).

In the embodiment illustrated in FIGS. 8-9, fluid received by the conduit 130 flows into the first branch 160a and through the passageway 162 to the second branch 160b. The fluid is discharged from the nozzles 132 disposed on each of the first branch 160a and the second branch 160b. The discharge is adjacent to the first ends 156 of the channels 146. In the embodiment illustrated in FIGS. 8-9, when the fluid is air, the air is discharged by the nozzles 132 flows across the first ends 156 of the channels 146. The air forces debris off of the first ends 156 of the channels 146 (and off of the outer ends 166 of the fins 144) as the air flows across the first ends 156.

In the embodiment illustrated in FIGS. 10-11, fluid received by the conduit 130 flows into the first branch 160a and through the passageway 162 to the second branch 160b and to the third branch 160c. The fluid is discharged from the nozzles 132 on each of the branches 160. In the embodiment illustrated in FIGS. 10-11, the fluid is discharged by the nozzles at both the first ends 156 and the second ends 158 of the channels 146. When the fluid is air (e.g., pressurized air or the like), the air forces debris out of the channel 146 as the air flows in the channel 146. In the embodiment of FIGS. 10-11, some of the nozzles 132 on the third branch 160c discharge into channels 146 formed by the plurality of fins 144 disposed on the first heat exchanger 128a and other nozzles 132 on the third branch 160c discharge into channels 146 formed by the plurality of fins 144 disposed on the second heat exchanger 128b. In the embodiment shown in FIGS. 10-11, fluid may enter a channel 146 through a nozzle 132 at the first end 156 and at the second end 158 of the channel 146 through a different nozzle 132.

In the embodiment illustrated in FIGS. 12-13, fluid received by the conduit 130 flows into the first branch 160a and through the passageway 162 to the second branch 160b and to the third branch 160c. The fluid is discharged from the nozzles 132 on each of the branches 160. In the embodiment illustrated in FIGS. 12-13, the fluid is discharged by the nozzles 132 in a generally downward direction into the channels 146 (best seen in FIG. 13). When the fluid is air (e.g., pressurized air or the like), the air forces debris out of the channel 146 as the air flows in the channel 146.

In the embodiment illustrated in FIGS. 14-15, fluid received by the conduit 130 flows into the first branch 160a and through the passageway 162 to the second branch 160b and to the third branch 160c. The fluid is discharged from the nozzles 132 on each of the branches 160. In the embodiment illustrated in FIGS. 12-13, the fluid is discharged by the nozzles 132 in a generally downward direction on to the first ends 156 of the channels 146 (the first end 156 distal to the base end 164 of the fin 144 (best seen in FIG. 15). When the fluid is air (e.g., pressurized air or the like), the air forces debris off of the channel 146 as the air flows onto the first ends 156.

Block 1750 includes generating by the fan 120 a second fan airflow, wherein the second fan airflow direction B is opposite to the first fan airflow direction A. The controller 178 may in some embodiments automatically cause the fan 120 to generate the second fan airflow during or after block 1730 or during block 1740. This block 1750 is optional and may be particularly beneficial in embodiments such as those illustrated in FIGS. 12-15 when the one or more branches 160 are disposed across the outlet 139 and over the channels 146, and one or more nozzles 132 are oriented to spray or blow fluid into one or more channels 146 in a direction C that substantially the same as the second fan airflow direction B. When a release agent is utilized, the airflow from the fan 120 helps to spread in the channels 146 the release agent that has been sprayed into the channels 146. When the fluid is air (air, pressurized air, compressed air, or the like), the airflow from the fan 120 that flows into the channels 146 assists the air that is discharged from nozzles 132 with cleaning debris out of the channels 146. This is particularly the case when the airflow from the fan 120 flows in the same or substantially the same direction as the air emitted from the nozzles 132.

The features disclosed herein may be particularly beneficial to machines 100 such as asphalt pavers 102 or the like that have cooling packages 122. Often it may be difficult to access areas of cooling packages 122 with air wands and associated hoses in order to blow out debris that has accumulated with use of the machine 100. Use of the features herein, where the conduit 130 is integrated into the cooling package 122, enables debris to be more easily and efficiently removed from cooling packages 122. In addition, the features disclosed herein allow for a more compact footprint for the cooling package 122 than those cooling packages 122 that incorporate hinged doors to provide access for blowing out debris from the heat exchanger 128.

What is claimed is:

1. A machine comprising:
   a cooling package mounted on the machine, the cooling package including:
      a housing defining a cavity, the housing having an outlet and an inlet, the outlet disposed opposite to the inlet;
      a cooler disposed in the housing, the cooler configured to receive a heated machine fluid generated by the machine during operation;
      a heat exchanger disposed in the housing and configured to convey heat away from the cooler, the heat exchanger including a plurality of fins coupled to and extending outward from the cooler, the plurality of fins defining a plurality of channels, each channel having a first end and a second end;
      a conduit mounted to an inner surface of the housing and disposed between the housing and the plurality of fins; and
      a plurality of nozzles mounted on the conduit and in fluid communication with the conduit, wherein each nozzle is configured to inject fluid into the first end of a corresponding channel, and wherein the plurality of nozzles are configured to discharge a fluid into each channel toward the second end of each channel; and
   a fan disposed adjacent to the housing, the fan configured to generate fan airflow in a first fan airflow direction from the inlet through the outlet of the housing.

2. The machine of claim 1, in which each of the plurality of channels includes an open bottom and an open top, wherein each channel is oriented to longitudinally extend transverse to the first fan airflow direction,
   wherein a first nozzle of the plurality of nozzles is disposed adjacent to a first open bottom of a first channel of the plurality of channels, the first nozzle oriented to discharge a fluid into the first channel.

3. The machine of claim 1, in which each of the plurality of channels includes an open bottom and an open top, wherein each channel is oriented to longitudinally extend transverse to the first fan airflow direction,
   in which the conduit includes a branch disposed across the outlet and transverse to the plurality of channels, wherein one or more of the plurality of nozzles is disposed on the branch and is oriented to discharge the fluid into at least one of the channels.

4. The machine of claim 1, wherein each fin is corrugated and each channel is oriented to longitudinally extend parallel to the first fan airflow direction, each fin including a base end disposed on the cooler and an outer end disposed opposite to the base end and distal from the cooler; and
   wherein each nozzle of the plurality of nozzles is oriented to discharge the fluid across the first end of at least one of the channels.

5. The machine of claim 1, wherein each fin is corrugated and each channel is oriented to longitudinally extend parallel to the first fan airflow direction; and
   in which the conduit includes a branch disposed across the outlet and transverse to the plurality of channels, wherein one or more of the plurality of nozzles is disposed on the branch and oriented to discharge the fluid into at least one of the channels.

6. The machine of claim 5, in which the fan is further configured to generate fan airflow in a second fan airflow direction that is opposite to the first fan airflow direction, the machine further including a controller, the controller configured to:
   prior to or during operation of the nozzles, activate the fan to generate airflow in the second fan airflow direction.

7. The machine of claim 1, wherein the fluid discharged by the nozzles is air or a release agent.

8. The machine of claim 1, wherein the fluid discharged by the nozzles is air or a release agent, the release agent including water or a degreasing agent.

9. An asphalt paver comprising:
   a cooling package mounted on the asphalt paver, the cooling package including:
      a housing defining a cavity, the housing having an outlet and an inlet, the outlet disposed opposite to the inlet;
      a first cooler disposed in the housing, the first cooler configured to receive a first heated machine fluid generated by the asphalt paver during operation;
      a first heat exchanger disposed in the housing and configured to convey heat away from the first cooler, the first heat exchanger including a first plurality of fins coupled to and extending outward from the first cooler, the first plurality of fins defining a first plurality of channels;
      a conduit, wherein at least a portion of the conduit is mounted to an inner surface of the housing and is disposed between the housing and the first plurality of fins; and
      a plurality of nozzles mounted on the conduit and in fluid communication with the conduit, wherein each nozzle is configured to inject fluid into the first end of a corresponding channel, and wherein the nozzles are configured to discharge a fluid through each channel; and
   a fan disposed adjacent to the housing, the fan configured to generate fan airflow in a first fan airflow direction from the inlet through the outlet of the housing during cooling operation.

10. The asphalt paver of claim 9,
in which each channel of the first plurality of channels includes an open bottom and an open top,
in which the conduit includes a first branch, a second branch and a passageway, each of the first branch and the second branch in fluid communication with the passageway, each of the first branch and the second branch disposed at least partially across the outlet and transverse to the first plurality of channels, the first branch and the second branch disposed adjacent to the open bottom of a first channel of the first plurality of channels, wherein a first nozzle of the plurality of nozzles is oriented to discharge the fluid into a first end of the first channel of the first plurality of channels, and a second nozzle of the plurality of nozzles is oriented to discharge the fluid into a second end of the first channel, the second end opposite to the first end.

11. The asphalt paver of claim 9, in which the cooling package further includes a second cooler disposed in the housing, the second cooler configured to receive a second heated machine fluid generated by the asphalt paver during operation; and
 a second heat exchanger disposed in the housing and configured to convey heat away from the second cooler, the second heat exchanger including a second plurality of fins coupled to and extending outward from the second cooler, the second plurality of fins defining a second plurality of channels; and
 in which the conduit includes a first branch, a second branch, a third branch and a passageway, each of the first branch, second branch and third branch in fluid communication with the passageway, each of the first branch and second branch disposed at least partially across the outlet and extending in a direction transverse to the first plurality of channels, the first branch disposed adjacent to one or more open bottoms of the first plurality of channels, the second branch disposed adjacent to one or more open bottoms of the second plurality of channels, the third branch disposed between the first heat exchanger and the second heat exchanger; and
 in which the plurality of nozzles includes a first plurality of nozzles disposed on the first branch and oriented to discharge the fluid into the first plurality of channels, a second plurality of nozzles disposed on the second branch and oriented to discharge the fluid into the second plurality of channels, a third plurality of nozzles disposed on the third branch and oriented to discharge the fluid into the first plurality of channels and a fourth plurality of nozzles disposed on the third branch and oriented to discharge the fluid into the second plurality of channels.

12. The asphalt paver of claim 9, in which the conduit includes a first branch, a second branch and a passageway, each of the first branch and the second branch in fluid communication with the passageway, each of the first and second branches disposed across the outlet and over the fins of the first plurality of channels, each of the first and second branches disposed transverse to the direction in which the first plurality of channels longitudinally extend, wherein the plurality of nozzles are disposed on the first and second branches and each nozzle of the plurality of nozzles is oriented to discharge fluid into at least one of the first plurality of channels.

13. The asphalt paver of claim 12, wherein the fins are corrugated.

14. The asphalt paver of claim 9, further including a controller configured to:
 prior to or during operation of the nozzles, activating the fan to generated fan airflow in a second fan airflow direction, the second fan airflow direction opposite to the first fan airflow direction.

15. The asphalt paver of claim 9, wherein the fluid is air or a release agent.

* * * * *